US012792979B2

United States Patent

(12) United States Patent
Groszman et al.
(10) Patent No.: US 12,792,979 B2
(45) Date of Patent: Nov. 10, 2026

(54) MACHINE LEARNING TO ALLOCATE RESOURCES

(71) Applicant: RESMED DIGITAL HEALTH INC., San Diego, CA (US)

(72) Inventors: Ken Groszman, Cambridge, MA (US); Badri Raghavan, Lincoln, MA (US); Zhuo Qi Lee, Singapore (SG); Yang Yan, Singapore (SG); Yu Heng Goh, Singapore (SG); Alena Melnikova, Singapore (SG); Yu Jia Tan, Singapore (SG)

(73) Assignee: ResMed Digital Health Inc., San Diego, CA (US)

( * ) Notice: Subject to any disclaimer, the term of this patent is extended or adjusted under 35 U.S.C. 154(b) by 0 days.

(21) Appl. No.: 18/723,650

(22) PCT Filed: Dec. 22, 2022

(86) PCT No.: PCT/US2022/082291
§ 371 (c)(1),
(2) Date: Jun. 24, 2024

(87) PCT Pub. No.: WO2023/122760
PCT Pub. Date: Jun. 29, 2023

(65) Prior Publication Data

US 2025/0053893 A1 Feb. 13, 2025

Related U.S. Application Data

(60) Provisional application No. 63/292,964, filed on Dec. 22, 2021.

(51) Int. Cl.
*G06Q 10/06* (2023.01)
*G06N 20/20* (2019.01)
(Continued)

(52) U.S. Cl.
CPC ......... *G06Q 10/0631* (2013.01); *G06N 20/20* (2019.01)

(58) Field of Classification Search
CPC ............................... G06Q 10/06; G06Q 30/02
See application file for complete search history.

(56) References Cited

U.S. PATENT DOCUMENTS 8,655,695 B1 * 2/2014 Qu .................... G06Q 30/0251 705/7.29
2009/0063268 A1 * 3/2009 Burgess ............ G06Q 30/0239 705/14.39
(Continued)

OTHER PUBLICATIONS

International Preliminary Report on Patentability received for PCT Patent Application No. PCT/US2022/082291, mailed on Jul. 4, 2024, 07 pages.
(Continued)

*Primary Examiner* — Nga B Nguyen
(74) *Attorney, Agent, or Firm* — Patterson + Sheridan, LLP

(57) ABSTRACT

Techniques for resource allocation using machine learning are provided. A plurality of user segments is identified based on a plurality of features describing the users, and a set of predicted conversion scores is generated for the plurality of user segments using a trained surrogate model. A set of user segments, from the plurality of user segments, is selected by processing the set of predicted conversion scores using an acquisition model. A first resource allocation is generated for the set of user segments at a first point in time, where at least one user segment not included in the set of user segments is not allocated resources at the first point in time.

19 Claims, 8 Drawing Sheets

(51) Int. Cl.
*G06Q 10/0631* (2023.01)
*G06Q 30/02* (2023.01)

(56) References Cited

U.S. PATENT DOCUMENTS

| | | | | |
|---|---|---|---|---|
| 2014/0244842 | A1* | 8/2014 | Rosensweig | H04L 41/18 709/226 |
| 2016/0063544 | A1* | 3/2016 | Srivastava | G06Q 30/0267 705/14.52 |
| 2016/0358206 | A1* | 12/2016 | Sachdev | G06Q 30/0255 |
| 2020/0050968 | A1 | 2/2020 | Lee et al. | |
| 2020/0134489 | A1 | 4/2020 | Achin et al. | |
| 2020/0160373 | A1* | 5/2020 | Thimmaiah | G06Q 30/0246 |
| 2020/0202267 | A1* | 6/2020 | Servidone | G06F 16/904 |
| 2022/0129828 | A1* | 4/2022 | Yates | G06N 5/04 |
| 2023/0099266 | A1* | 3/2023 | Horan | G06Q 10/1057 705/2 |

OTHER PUBLICATIONS

International Searching Authority, International Search Report and Written Opinion for PCT Application No. PCT/UUS2022/082291, dated Mar. 29, 2023.

Extended European Search Report and Search Opinion received for European Application No. 22912750.1, mailed on Nov. 26, 2025, 10 pages.

Nikhil et al., "Customer Segmentation Using Machine Learning In: Recent Trends in Intensive Computing", Dec. 1, 2021, XP093335303.

Yike et al., "Automated audience segmentation using reputation signals", Proceedings of the 24th ACM SIGKDD International Conference on Knowledge Discovery & Data Mining, Jul. 19, 2018, pp. 186-195.

* cited by examiner

MACHINE LEARNING TO ALLOCATE RESOURCES

CROSS-REFERENCE TO RELATED APPLICATIONS

This application is a 371 national phase application of PCT Application No. PCT/US2022/082291 filed Dec. 22, 2022, which claims benefit of U.S. provisional patent application Ser. No. 63/292,964 filed Dec. 22, 2021. The aforementioned related patent applications are herein incorporated by reference in their entirety.

INTRODUCTION

Aspects of the present disclosure relate to machine learning. More specifically, aspects of the present disclosure relate to using machine learning to generate optimized resource allocations.

In a wide variety of computing and non-computing environments, the available resources are often dwarfed by the needed resources. That is, the resources available for allocation are often relatively limited, while the potential uses for such resources are much more expansive. Typically, users must therefore evaluate the potential alternatives in order to make difficult resource allocation decisions in an effort to maximize the productive use of those limited resources. However, given the vast number and variety of options, human users are ill-equipped to make such allocation decisions, and conventional solutions invariably result in sub-optimal allocations, wasted resources, and lost potential.

Moreover, failing to efficiently allocate resources can lead to a wide variety of negative downstream effects. As one example, systems seeking to identify, diagnose, and treat patients generally have limited resources available to be dedicated to these tasks, and failing to effectively allocate the resources can result in a larger number of users going undiagnosed and/or untreated. For example, a variety of resources are needed to identify users that potentially have obstructive sleep apnea (OSA), test and diagnose these users, and provide appropriate treatment (such as continuous positive airway pressure (CPAP) machines) to the relevant users. Conventional systems do not provide objective, efficient, and accurate techniques to drive these resource allocation decisions in order to effectively assist the users in need.

Improved systems and techniques to allocate limited resources are needed.

SUMMARY

According to one embodiment presented in this disclosure, a method is provided that includes: identifying a plurality of user segments based on a plurality of features describing the users; generating, using a trained surrogate model, a first set of predicted conversion scores for the plurality of user segments; selecting a first set of user segments, from the plurality of user segments, by processing the first set of predicted conversion scores using an acquisition model; and generating a first resource allocation for the first set of user segments at a first point in time, wherein at least one user segment not included in the first set of user segments is not allocated resources at the first point in time.

Other aspects provide processing systems configured to perform the aforementioned method as well as those described herein; non-transitory, computer-readable media comprising instructions that, when executed by one or more processors of a processing system, cause the processing system to perform the aforementioned methods as well as those described herein; a computer program product embodied on a computer-readable storage medium comprising code for performing the aforementioned methods as well as those further described herein; and a processing system comprising means for performing the aforementioned methods as well as those further described herein.

The following description and the related drawings set forth in detail certain illustrative features of one or more embodiments.

DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1:
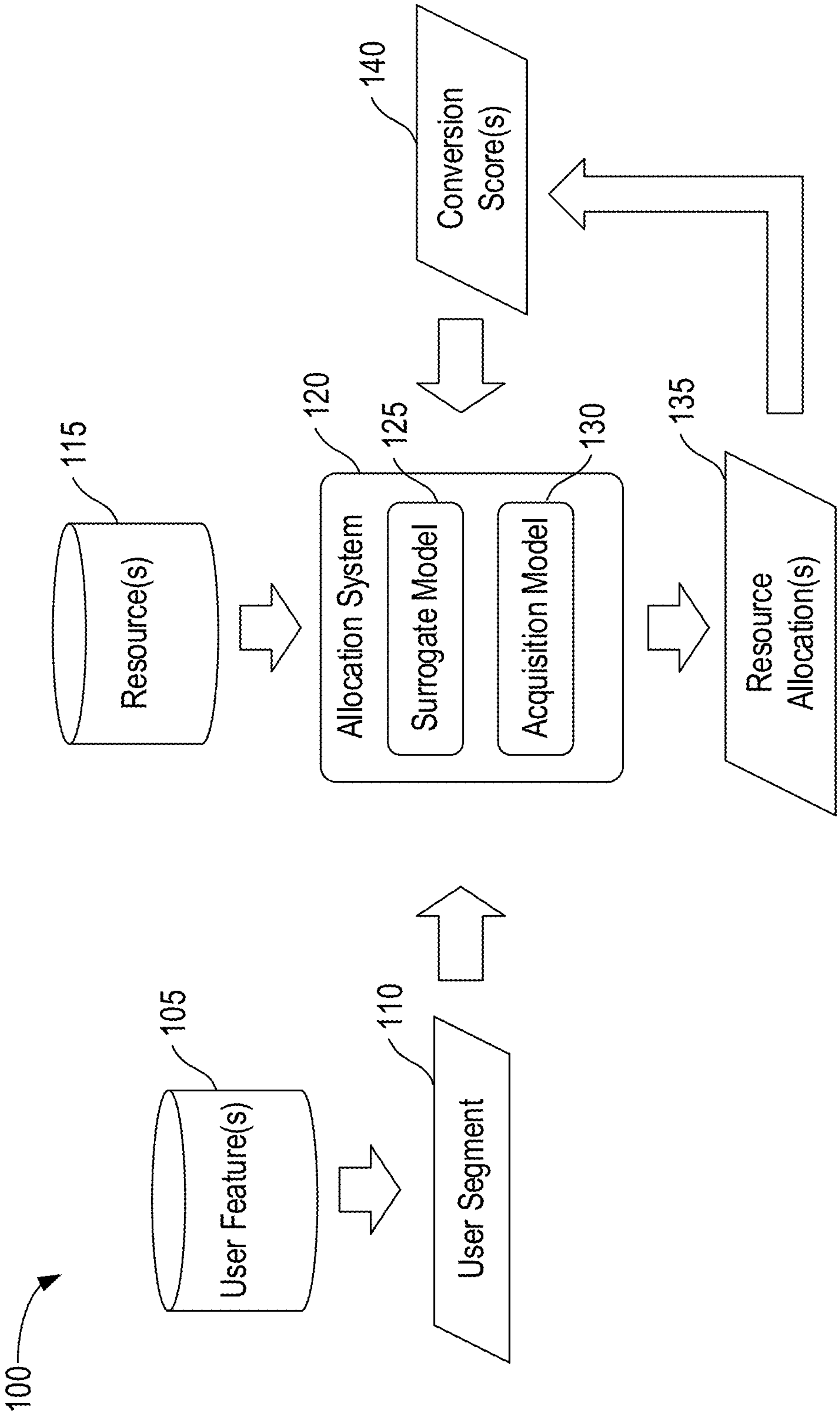
FIG. 1 depicts an example workflow for training and using machine learning models to improve resource allocation.

Aspects of the present disclosure provide apparatuses, methods, processing systems, and computer-readable mediums for training and using machine learning to allocate limited resources.

In some embodiments, a surrogate model is trained and refined to enable prediction of the benefits or improvements that can be generated as a result of various alternative resource allocations. This model can then be used to drive resource allocation, and the resulting allocations can be monitored to collect further data that may be used to refine the surrogate model. In this way, over a series of allocation cycles, the model facilitates significantly improved resource allocations, resulting in a wide variety of benefits including reduced waste, improved output or results from the use of the resources, and the like.

In some aspects of the present disclosure, targeted diagnosis efforts are discussed as examples of resources that can be allocated using the machine learning techniques described herein. However, aspects of the present disclosure are readily applicable to a wide variety of resource allocations, including to allocating computing resources across components and systems (e.g., allocating bandwidth, memory, and processer time), allocating monetary resources among competing alternatives, allocating resources related to available time or effort, and the like.

In at least one embodiment, a set of features are used to define segments of users, from a broad population. For example, based on features such as user age, gender, location, and the like, users may be delineated into orthogonal (e.g., non-overlapping) segments. Though orthogonal segments are discussed in some examples of the present disclosure, in some embodiments, the segments may be non-orthogonal. As used herein, a segment may be defined using feature values of any granularity or specificity. For example, in some aspects, a first segment may correspond to users in a specific city that are a specific age (e.g., twenty five). A second segment may correspond to users in a specific state or country, within a specific age range (e.g., 25 to 35). In some aspects, multiple segments (e.g., each defined using specific feature values or ranges) may be aggregated to form a broader segment (e.g., encompassing all users in each of the smaller segments).

In an embodiment, an allocation system can use one or more machine learning models to allocate limited resources among these user segments. For example, the allocation system may be used to make targeted content or diagnosis efforts, such as via identifying which segment(s) should be targeted with particular outreach efforts, in order to improve the resulting diagnoses. In some aspects, the allocation system may select specific/granular segments (e.g., with specific or narrow ranges of values for each feature), and/or may select larger segments/groups of segments for further resource allocation (e.g., where smaller/more specific segments may correspond to particular genders, regions, ages, and the like, and a corresponding larger segment may correspond to all users between the ages of 25 and 50, regardless of gender, location, and the like).

Though segments of users (delineated based on user features) are described in some embodiments for conceptual clarity, aspects of the present can generally be applied for any segments, defined by any features. For example, in one embodiment, the features can include alternative targeted content, alternative delivery methods, and the like. In such an embodiment, each user segment indicates not only the characteristics of the users in the segment, but also the type of targeted content to provide, the specific media to output, the method of delivering the content (e.g., which platform), and the like. That is, there may be a first segment corresponding to delivering a first piece of content to users younger than thirty, a second segment for delivering a second piece of content to users younger than thirty, a third segment for delivering the first piece of content to users older than thirty, and so on. In this way, each segment generally corresponds to a specific decision point or alternative in allocation resources, as defined by the features.

In one embodiment, the generated resource allocation(s) can then be monitored as discussed in more detail below in order to determine the impact of the allocation. In at least one embodiment, the aggregate results of a given allocation may be quantified using conversion data or a conversion score that indicates the benefits or improvements achieved using the given allocation. For example, in targeted diagnostic uses, the conversion data may include information relating to the number of users that were successfully identified, diagnosed, and/or treated using the allocated resources.

In some embodiments, based on the results of the allocations (e.g., based on quantified conversion scores), the allocation system can refine its model(s) in order to generate improved allocations for subsequent cycles. In this way, the allocation system enables generation of optimized and efficient resource allocations that cannot be created manually. For example, continuing the above example relating to targeted diagnostics, there may be many hundreds, thousands, or even millions of user segments, resulting in exponentially more alternative allocations (e.g., with varying resources allocated to each such segment). Further, to make such allocations efficiently, an enormous amount and variety of data should be evaluated. Humans are simply incapable of performing such analysis, and cannot provide the effective and improved allocations that are enabled by aspects of the present disclosure.

Example Environment for Machine Learning to Improve Resource Allocation

FIG. 1 depicts an example workflow 100 for training and using machine learning models to improve resource allocation.

In the illustrated example, an allocation system 120 is used to evaluate and use various data to train and use a variety of models to drive resource allocation decisions. Though a discrete allocation system 120 is depicted for conceptual clarity, in embodiments, the operations of the allocation system 120 may be implemented across any number of components or systems. The allocation system 120 may generally be implemented using hardware (e.g., as a discrete hardware component or system), software (e.g., as an application), or a combination of hardware and software. In at least one embodiment, the allocation system 120 is implemented in a cloud deployment.

As illustrated, a set of user features 105 are used to define discrete orthogonal user segments 110. In some embodiments, the user segments 110 are referred to as orthogonal to indicate that there is no overlap between them. That is, given a set of characteristics belonging to a particular user, the user may belong to single user segment 110 (and not to multiple). In some aspects, as discussed above, some or all of the user segments 110 may be non-orthogonal (e.g., at least partially overlapping). In some aspects, as discussed above, some or all of the user segments 110 may be defined as groups or blocks of smaller (more specific) segments.

In embodiments, the particular set of user features 105 (or, more generally, any feature) used by the allocation system 120 may vary depending on the particular implementation and application. In at least one embodiment, the user features 105 include, for example, user age (e.g., defined using windows such as 18-25, 26-35, and so on), user gender, the user's bed-sharing and/or room-sharing status (e.g., indicating whether they never share a bed or room when sleeping, sometimes do so, frequently do so, or always do so), the type of their geographic location (e.g., urban, rural, suburban, and the like), their geographic region in a country (e.g., northwest, south, Midwest, and the like), their education level (e.g., whether they completed one or more higher education curriculums, such as college-level degrees), the type of device they use (e.g., what type of smartphone they use), and the like. In an embodiment, each user feature 105 can generally include any number of levels or categories. For example, the "age" feature may include five categories (e.g., 25-34, 34-44, 45-54, 55-64, and 65+) while the "geography type" feature may include three (e.g., urban, rural, suburban). In some embodiments, one or more of the features may also include continuous data. Additionally, in some embodiments, as discussed above, the user features 105 include other elements such as which specific piece of content is to be delivered, what method(s) of delivery are to be used (e.g., specific social media platforms, television, radio, etc.), and the like.

Generally, the intersection of the user features 105 define the user segments 110. For example, if the user features 105 include an "age" feature and a "location type" feature, the user segments 110 may include a first segment for users aged 25-34 in a "suburban" setting, a second segment for users aged 25-34 in a "rural" setting, a third segment for users aged 25-35 in an "urban" setting, a fourth segment for users aged 35-44 in a "suburban" setting, and so on. Though this example involves two features for conceptual clarity, resulting in two-dimensional intersections, in embodiments, any number of features may be used (resulting in equivalently more complex intersections). Additionally, in some aspects, rather than defining user segments based on the features directly, the allocation system 120 may embed users into an embedding space (e.g., using a trained model) based on their respective characteristics (e.g., based on the values each user has for each feature). The allocation system 120 may then identify the user segments corresponding to similar users based on these embeddings, such as by using one or more clustering techniques on the embeddings, using principal component analysis, and the like.

In some embodiments, as discussed above, the granularity or specificity of the feature values, as well as the specific set of features, used to define each user segment 110 may vary depending on the particular implementation. For example, one segment may be defined for all users aged 25-34, while a second is defined for all users aged 25-34 that are located in an urban location. Similarly, a larger segment may be defined to include a variety of smaller segments (which may or may not be overlapping or adjacent). For example, a larger segment may include a first smaller segment for users 25-34, a second smaller segment for users 45-54, and the like.

In an embodiment, each user segment 110 may generally correspond to a set of characteristics defined by one or more specific values, one or more ranges of values, and/or one or more categories for each of the user features 105. That is, the user segments 110 may generally describe the user(s) that would belong to the segment, but may not actually indicate specific users.

As illustrated, the allocation system 120 can receive this set of user segments 110 for processing. In some embodiments, rather than receiving the user segments 110, the allocation system 120 can receive and evaluate the user features 105 to determine the set of user segments 110. In the illustrated example, the allocation system 120 can also receive some indication of the resources 115 that are to be allocated. In some embodiments, however, the allocation system 120 does not receive or evaluate the available resources 115, as discussed in more detail below. In the workflow 100, the allocation system 120 evaluates the user segment(s) and/or resource(s) 115 to generate a set of resource allocation(s) 135.

In embodiments, the characteristics of the resource allocation(s) 135 may vary depending on the particular implementation. For example, if the allocation system 120 does not receive or evaluate the actual resources 115, the resource allocations 135 may indicate, for each user segment 110 (or group of segments), allocation characteristics such as the priority of each segment when allocating resources (e.g., which segment(s) should receive full allocations first, allowing leftover resources to be used for lower priority segments), a subset of the user segments 110 that should receive the resources 115 (where non-selected user segments 110 may receive no resources during the given cycle), the amount of resources 115 to allocate to each user segment 110 (e.g., as a percentage of the overall resources 115), and the like. In some embodiments, if the allocation system 120 does receive the resources 115, the resource allocations 135 may indicate specific resources to be allocated to each user segment 110 (e.g., a specific amount of monetary resources, computing time, computer storage, and the like).

In the illustrated workflow 100, the allocation system 120 uses a surrogate model 125 and acquisition model 130 to generate the resource allocations 135. Generally, the surrogate model 125 is generated or trained by the allocation system 120 to predict the likely or probable outcomes of allocating resources to each user segment 110. The surrogate model 125 is generally referred to as a "surrogate" in that it is used to be used as an approximate representation of, or substitute for, the real-world environment (e.g., the actual user responses to various resource allocations). In some embodiments, the surrogate model 125 corresponds to a random forest model that predicts, for each user segment 110, an expected or probable conversion score (e.g., an expected number of users in the segment that will be successfully diagnosed, a monetary cost per such diagnosis, and the like).

In some embodiments, the particular contents or metrics reflected in the conversion data may vary depending on the particular implementation, and may include one or more metrics that the allocation seeks to predict, optimize, and/or improve. For example, one such metric may correspond to a single dimension (e.g., the percentage of users who, after viewing multimedia content, begin or start a sleep assessment). In some aspects, however, the conversion journey may include a variety of steps, including the content being served/shown/output for consumption, the content actually being observed by the user, the user clicking or selecting the content, the user arriving at the landing page, the user interacting with the landing page, the user performing one or more target actions on the landing page (e.g., beginning a survey), and the like. In some embodiments, each intermediate step in this conversion path may have a corresponding conversion rate which the system may seek to predict and/or optimize.

Further, in some embodiments, there may be multiple outcomes for a given user, and the system may seek to predict and/or optimize conversion rates for each such outcome. For example, one conversion path may lead to a sleep apnea solution, one to an insomnia solution, and the like, and the system may seek to optimize content delivery to improve the conversion metrics for each such path. Generally, the system may optimize one or more metrics or objectives simultaneously, where the metrics may have various relationships to each other (e.g., one metric being upstream to another, in that it corresponds to an earlier stage in the same journey) and/or may be orthogonal to each other.

As illustrated, based on the predicted outcomes (determined using the surrogate model 125), which may include multiple metrics or conversion scores, the allocation system 120 can use an acquisition model 130 to allocate the resources 115 among the user segments 110. In one embodiment, the acquisition model 130 can select the user segment(s) with the highest predicted conversion score(s) (e.g., any segments with a conversion score greater than a threshold, or the user segments with the top N conversion scores).

In some embodiments, the acquisition model 130 uses an explore-exploit approach to select user segments 110 based on a balance between the predicted scores (which may indicate the likely benefits of allocating resources to each segment) and the variances of the predicted scores (which may indicate segments where the predictions are uncertain, and therefore where substantial benefits could accrue if resources are allocated).

In at least one embodiment, the acquisition model 130 may use a random or semi-random process to drive the resource allocations 135 during an initialization stage of the workflow 100. This may be referred to as a "cold start" process in some embodiments. For example, the surrogate model 125 may be initialized using fixed or random values, as no actual data (e.g., no conversion data or conversion scores 140) may be known. That is, at initialization, it is generally unknown what benefits or improvements may accrue from various allocations of the resources 115. Therefore, in some embodiments, the surrogate model 125 is initialized using random or fixed values. In one such embodiment, the acquisition model 130 can nevertheless use these (effectively random) predictions of the surrogate model 125 to drive the initial set of resource allocations 135. In other embodiments, the acquisition model 130 may randomly or semi-randomly select the resources allocations 135 in the first cycle.

In some embodiments, rather than using this cold (random) start process, the acquisition model 130 can alternatively use a set of pre-selected segments (or other information) to drive the resource allocations 135 during the first or initialization stage. This may be referred to as a "warm start" or "hot start" process in some embodiments. For example, based on domain knowledge such as historical conversion data, input from subject matter experts (SMEs), and the like, the initial set of segments selected in the initial iteration (e.g., the first set of resource allocations 135) may be defined or provided (as opposed to the random cold start discussed above). In at least one embodiment, this initial selection may correspond to selecting a one or more large segments of users that cover one or more smaller segments, as discussed in more detail below, in order to reduce cost and improve efficiency of the initial allocations. In an embodiment, the warm start approach may improve the efficiency of the workflow 100 and reduce waste or expense, in some aspects.

In at least one embodiment, regardless of how the initialization set of resource allocations is determined, the acquisition model 130 can ensure that the set reflects all possible values of all possible user features 105.

That is, the acquisition model 130 may select a subset of user segments 110 to receive at least a portion of the resources, ensuring that the subset includes all possible values for all possible features 105. For example, if the user features 105 include an "age" feature with two categories (e.g., 18-39, and 40+) the acquisition model 130 may ensure that at least one of the selected user segments 110 specifies an age in the first category (18-39), and that at least one of the selected user segments 110 specifies an age in the second category (40+). Similarly, if the user features 105 include a "location type" feature having three categories (e.g., urban, suburban, and rural), the acquisition model 130 may ensure that the subset has at least one user segment 110 specifying an "urban" type, at least one segment specifying a "suburban" type, and at least one segment specifying a "rural" type.

In an embodiment, this can allow the acquisition model 130 to select the initialization set randomly or pseudorandomly, while ensuring that the initialization set still results in good coverage of the feature space (e.g., where each feature is fully represented). This ensures that the resulting conversion scores 140 reflect at least some data for each feature value, and thereby ensures that the surrogate model 125 is trained to cover all these values. Alternatively, in some embodiments, the initialization set may be selected or defined based on domain knowledge (e.g., based on historical conversion information and/or input from one or more subject matter experts). On subsequent rounds, the acquisition model 130 may use the surrogate model 125 to drive the selection process (rather than the random or semi-random process described above).

As illustrated, the acquisition model 130 thereby enables the resource allocations 135 to be generated. As discussed above, the nature of the resource allocations 135 may vary depending on the particular implementation and deployment. Generally, the resource allocations 135 indicate how one or more resources (e.g., resources 115) should be allocated among the user segments 110, as discussed above.

In one aspect, in a targeted diagnosis or outreach implementation, the resource allocations 135 may indicate which user segment(s) 110 should be targeted during a subsequent or future time (e.g., during a window of time, such as the next week), how they should be targeted, and the like. For example, for a given user segment 110, the resource allocations 135 may indicate whether any targeted content should be delivered. If so, they may indicate what targeted content should be delivered (e.g., which creative output, such as an advertisement or multimedia output, of a set of alternatives), how the content should be delivered (e.g., using one or more social media avenues, using radio, using printed publications, and the like), an amount of content to deliver (e.g., a monetary budget to disseminate the content, a number of discrete content deliveries, and the like).

In the workflow 100, a set of conversion score(s) 140 can then be determined based on the resource allocations 135. For example, the resource allocations 135 may be used to drive or provide targeted content, as discussed above. In one such example, the conversion scores 140 may indicate, for each user segment, data such as the number (or percentage) of users that selected, clicked on, or otherwise sought more information based on the content, the number (or percentage) of users that successfully completed a diagnostic test based on the content, the number (or percentage) of users that were diagnosed with one or more disorders (such as obstructive sleep apnea) using the content, and the like.

In this way, the conversion scores 140 may generally represent the efficiency or improvements obtained by allocating resources to one or more user segment(s) 110 (e.g., in terms of resources used to obtain the benefits, such as the cost-per-impression of the content, the cost-per-click of the content, the cost-per-diagnosis using the content, and the like).

In at least one embodiment, the allocation system 120 (or another system) can determine the conversion scores 140 by first implementing the resource allocations 135 (e.g., deploying the targeted content), and then monitoring the conversion data over a window of time (e.g., over one week). At the end of this period, the allocation system 120 can use the aggregate conversion scores 140 to refine or update the surrogate model 125, as discussed in more detail below.

In the workflow 100, during a next or subsequent cycle or window of time, the allocation system 120 can use the refined surrogate model 125 and the acquisition model 130 to generate a new set of resource allocations 135, which can similarly be used to drive use of resources. In some embodiments, a new set of conversion scores 140 can similarly be collected, allowing the allocation system 120 to again refine the surrogate model 125 and repeat the cycle.

In some embodiments, the allocation system 120 can repeat this cycle indefinitely, or until termination criteria are met. For example, the allocation system 120 may continue to allocate resources and refine the surrogate model 125 periodically (e.g., weekly or monthly) indefinitely, such that the resource allocations 135 are continuously updated to reflect any changing realities of the user segments 110 or environment. In some embodiments, the allocation system 120 can repeat the cycle until some criteria are met, such as a maximum number of iterations, a desired prediction accuracy (e.g., when the predictions output by the surrogate model 125 closely match the actual conversion scores 140 within a defined threshold), and the like.

In some embodiments, the prediction accuracy of the surrogate model is defined using mean absolute error (MAE), where the accuracy of the surrogate model in predicting the actual conversion scores 140 (determined using experimentation or simulation) is evaluated across all of the user segments 110 (or across all user segments for which real data is available). In one embodiment, the accuracy of the surrogate model is determined with respect to a subset of the segments, such as with respect to the top five segments having the highest predicted (or actual) conversion score 140.

As discussed above, the allocation system 120 is thereby able to generate dynamic and efficient resource allocations 135 that can significantly reduce wasted resources, increase the benefits or improvements achieved by allocating resources improve diagnostic results, and the like.

Example Workflow for Using Machine Learning to Allocate Resources

Figure 2:
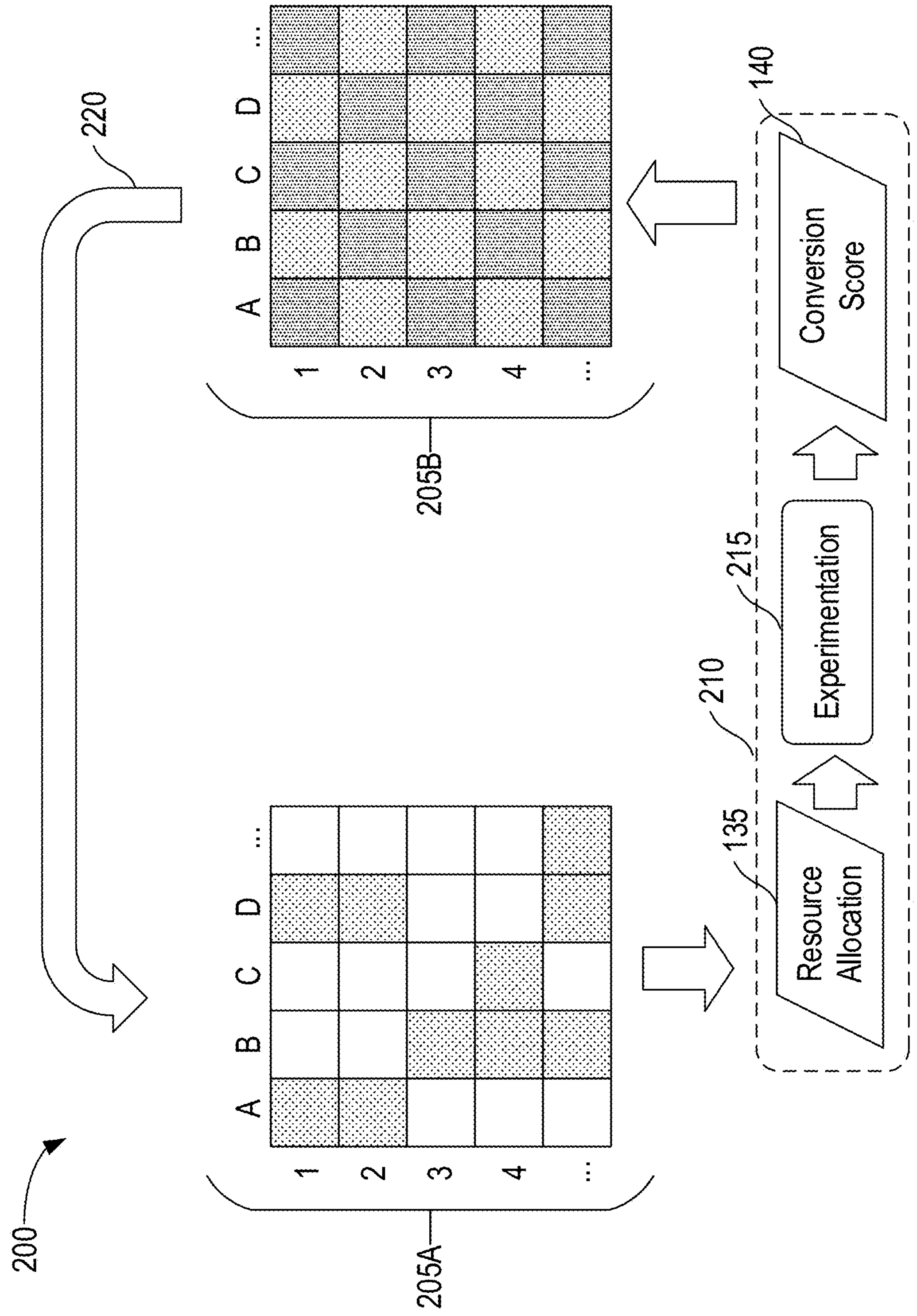
FIG. 2 depicts an example workflow for using and refining machine learning models for resource allocation.

FIG. 2 depicts an example workflow 200 for using and refining machine learning models for resource allocation. In one embodiment, the workflow 200 is performed by an allocation system, such as allocation system 120 of FIG. 1.

In the workflow 200, a chart 205A is used to depict various user segments, defined by intersections of user features. Specifically, in the illustrated example, the user features include a first feature having categories “A,” “B,” “C,” and “D,” arranged along the horizontal axis of the chart 205A (with a column for each category). The chart 205A also depicts a second feature having categories “1,” “2,” “3,” and “4” arranged along the vertical axis (where each category has a row). Although four categories are included in each feature, as discussed above and indicated by the ellipsis, each feature may have any number of associated categories.

Additionally, though the illustrated example depicts two features for conceptual clarity (resulting in a two-dimensional chart 205A), in embodiments, any number of features may be used (resulting in equivalently more complex intersections). As discussed above, each user segment generally corresponds to a specific set of values for each feature. In the illustrated example, therefore, each row/column intersection (e.g., each square in the grid of the chart 205A) corresponds to a given user segment. That is, the chart 205A reflects a user segment for users having value “A” for the first feature and value “1” for the second, a segment for those having value “A” for the first and value “2” for the second, and so on.

In some embodiments, as discussed above, the allocation system outputs allocations that specify a subset of user segments, from the overall set of all segments, that should have resources allocated (e.g., during a defined period of time). For example, the allocation system may indicate which user segment(s) should be targeted using media content during the window, in an effort to improve diagnostic results. In the illustrated example of the chart 205A, stippling is used to indicate which segments were selected (e.g., by an acquisition model) to receive resources. Specifically, the allocation system has selected the “A1” segment, the “A2” segment, the “B3” segment, and so on. In some aspects, as discussed above, in addition to or instead of selecting individual/small segments (e.g., the “A1” segment), the allocation system may select broader/larger segments (also referred to as groups of small segments), such as a segment that includes both the “A1” users and the “B4” users.

In some aspects, such a larger segment may allow the allocation system to effectively cover the same set(s) of users with reduced segmentation, enabling more efficient allocation and use of resources. For example, if segments “A1,” “A2,” and “B3” are selected, to execute the experimentation 215 (discussed below in more detail), three segments/allocations are used. In contrast, if a segment “A1/A2/B3” is used, the same set of users can be tested using a single segment/allocation, which can improve efficiency and reduce costs.

In embodiments, as discussed above, this selection may be performed by an acquisition model or function that evaluates the output of a trained surrogate model. For example, based on the predicted conversion score and/or score variance for each user segment, the acquisition model may select a subset of user segments. In some embodiments, as discussed above, the allocation system may additionally or alternatively use a random or pseudo-random process, or a manual selection process (e.g., during an initialization phase) to select the subset. In at least one aspect, during initialization, one or more larger segments may be selected (e.g., selected by subject matter experts). The system may gradually morph the segment(s) over time using the acquisition model and surrogate model to identify or determine an optimized allocation.

In some embodiments, the acquisition model uses an expected improvement (EI) function to evaluate the segments in an effort to maximize the expected improvements over the current maximum observed experimental value (e.g., the highest conversion score 140 that has been observed based on experiments or simulations). In at least one embodiment, the acquisition model is defined using Equation 1 below, where $EI(\vec{x})$ is the acquisition score (e.g., a score indicating the expected improvement), $\vec{x}$ is a vector of user segment features indicating a specific user segment (e.g., a vector having f values, where each value corresponds to a feature in the set of user features), $\mu(\vec{x})$ and $\sigma(\vec{x})$ are the prediction mean and standard deviation (or variance), respectively, from the surrogate model at user segment $\vec{x}$, $q^+$ is the maximum observed (or predicted) conversion score (e.g., observed via experimentation or simulation), $\xi$ is a hyperparameter that controls the exploration-exploitation tradeoff (in some embodiments, this value is set to 0.01 to provide a good balance), $\Phi(Z)$ and $\phi(Z)$ represent the cumulative distribution function (CDF) and probability distribution function (PDF), respectively, of Z, and Z is the z-score of the predicted score for the segment $\vec{x}$ relative to the maximum observed value $q^+$ (defined in more detail below in to Equation 2).

$$EI(\vec{x}) = (\mu(\vec{x}) - q^{+} - \xi)\Phi(Z) + \sigma(\vec{x})\phi(Z) \quad \text{(Eq. 1)}$$

$$Z = \frac{\mu(\vec{x}) - q^{+} - \xi}{\sigma(\vec{x})} \quad \text{(Eq. 2)}$$

In some embodiments, to select the next point to query (e.g., the next user segment to allocate resources to for evaluation), the acquisition model uses equation 1 to find the N user segments having the maximum acquisition score. In embodiments, this may be accomplished using brute force (e.g., evaluating EI($\vec{x}$) for all segments (e.g., for each $\vec{x}$). In at least one embodiment, the acquisition model can use one or more optimization techniques, such as greedy heuristics, to perform the segment selection process. For example, the system may use a multi-start local search approach to perform this process.

As illustrated, these selections drive an operation for each selected segment to determine corresponding conversion data for the segment. That is, for each user segment selected by the allocation system, the operation 210 is initiated. In one embodiment, each segment not included in the selected subset has no resources allocated to it during the window. For example, in the case of targeted content for diagnostics, selected user segments may receive one or more pieces of targeted content during the window, while non-selected user segments receive no targeted content during the window.

In the illustrated example, the operation 210 includes, for each user segment in the selected subset of user segments, a respective resource allocation 135 (e.g., indicating what resource(s) to allocate to the segment), a respective experimentation phase 215, and resulting conversion score 140. The experimentation phase 215 generally corresponds to one or more experiments or simulations used to evaluate the results of the resource allocation 135 for the segment.

For example, for targeted content for improved diagnostics, the experimentation phase 215 may correspond to deploying the targeted content to the segment (e.g., using social media) and monitoring the resulting user interactions with the content (e.g., the number of users in the segment who view or are presented with the content, the number or percentage of such users that click or otherwise interact with the content, the number or percentage that complete the diagnostic process (e.g., via a survey or healthcare visit), the number or percentage that are diagnosed based on this process, and the like.

In some embodiments, the experimentation phase 215 can include use of one or more simulations. For example, to bootstrap initialization of the surrogate model when no real-world data is available, a simulation model may be used to perform one or more initial training cycle(s). In an embodiment, the simulation model is used with the assumption that there exists an unknown function that gives the conversion score for any given segment. Although in some embodiments these conversion scores are evaluated using real-world experiments, in other embodiments, they may therefore be simulated or synthesized during the experimentation phase 215.

In one such embodiment, the simulation model is configured as a "black box" function that simulates or synthesizes conversion data using Equation 3 below, where p($\vec{x}$) is the predicted generated output for segment $\vec{x}$, and coefficients $\alpha_i$ and $\gamma_{ij}$ are drawn from a uniform random distribution (e.g., a random distribution having a mean of −0.007 and standard deviation of 0.02). In some embodiments, sparsity is imposed on the coefficient $\gamma_{ij}$ such that $\{\gamma_{ij}>0\}|\leq k$, where k is a hyperparameter used as the sparsity constraint. This sparsity constraint effectively limits the number of complex interaction terms, in Equation 3, that can be nonzero, which keeps the function mostly linear and reduces complexity.

$$p(\vec{x}) = \sum_i \alpha_i x_i + \sum_i \sum_j \gamma_{ij} x_i x_j \quad \text{(Eq. 3)}$$

In one embodiment, the simulation model can then be defined using Equation 4 below, where $f_{bb}(\vec{x})$ is the predicted conversion score for the user segment $\vec{x}$.

$$f_{bb}(\vec{x}) \begin{cases} 0, \text{ if } p(\vec{x}) < 0 \\ 1, \text{ if } p(\vec{x}) < 1 \\ p(\vec{x}), \text{ else} \end{cases} \quad \text{(Eq. 4)}$$

In some embodiments, to query the simulation model to generate a synthesized or simulated conversion score, the acquisition model can use Equation 5 below, where $q_{bb}(\vec{x})$ is the simulated score and $\epsilon$ is random noise, e.g., defined as $$\epsilon \sim N\left(0, \sqrt{\frac{p(\vec{x})(1 - p(\vec{x}))}{n}}\right),$$

where n is the sample size of the experiment (e.g., the simulated or expected number of events being simulated, such as the number of diagnoses).

$$q_{bb}(\vec{x}) \begin{cases} r(\vec{x}) := f_{bb}(\vec{x}) + \epsilon, \text{ if } 0 \leq r \leq 1 \\ 0, \text{ if } r(\vec{x}) < 0 \\ 1, \text{ if } r(\vec{x}) < 1 \end{cases} \quad \text{(Eq. 5)}$$

As discussed above, the conversion score(s) 140 generally reflect the aggregate results data for the given user segment, such as the cost-per-diagnosis in the case of targeted diagnostics. In the illustrated example, these conversion scores 140 are then used to update the surrogate model. Specifically, as illustrated by the stippling in the chart 205B, the surrogate mode can use the conversion scores 140 to learn conversion data for all user segments, even though a subset of the user segments (indicated in chart 205A) were actually evaluated. That is, the surrogate model can be trained using the conversion scores 140 for the subset of user segments to generalize and make predictions regarding potential or predicted conversion scores for all of the user segments.

In embodiments, the surrogate model is generally trained to fit the conversion scores 140. For example, in some embodiments, the surrogate model uses regression (e.g., a linear regression model) to fit a line or curve to the data points (e.g., to the conversion scores 140). In some embodiments, the surrogate model is a random forest model (e.g., comprising a set of regression trees), which may be trained using, for example, cross-validation, or some other non-linear optimizer. For example, the allocation system may construct the random forest as a set of N regression trees, where N is a hyperparameter and each regression tree is trained using data points randomly sampled (with repetitions) from the conversion scores 140.

After being so trained or refined, the model(s) can then be used to predict the resulting conversion scores 140 for each segment, as discussed above. That is, the surrogate model may indicate the expected or predicted conversion score 140 (e.g., the number of diagnoses, or the cost-per-diagnosis) for each segment. For example, in the case of a linear regression model, the model may simply output the predicted score for each segment. In the case of a random forest model, the allocation system may determine the mean or average predicted scores output by each tree in the forest. In some embodiments, the surrogate model can also be used to determine the variance of these predictions. For example, using a random forest model, the prediction variance may be determined based on the variance in predictions from each individual tree in the forest.

As illustrated by arrow 220, this refined surrogate model can then be used by the allocation system to initiate a subsequent round or cycle, such as by selecting a new subset of user segments (e.g., using the acquisition model) for testing or simulation.

Figure 3:
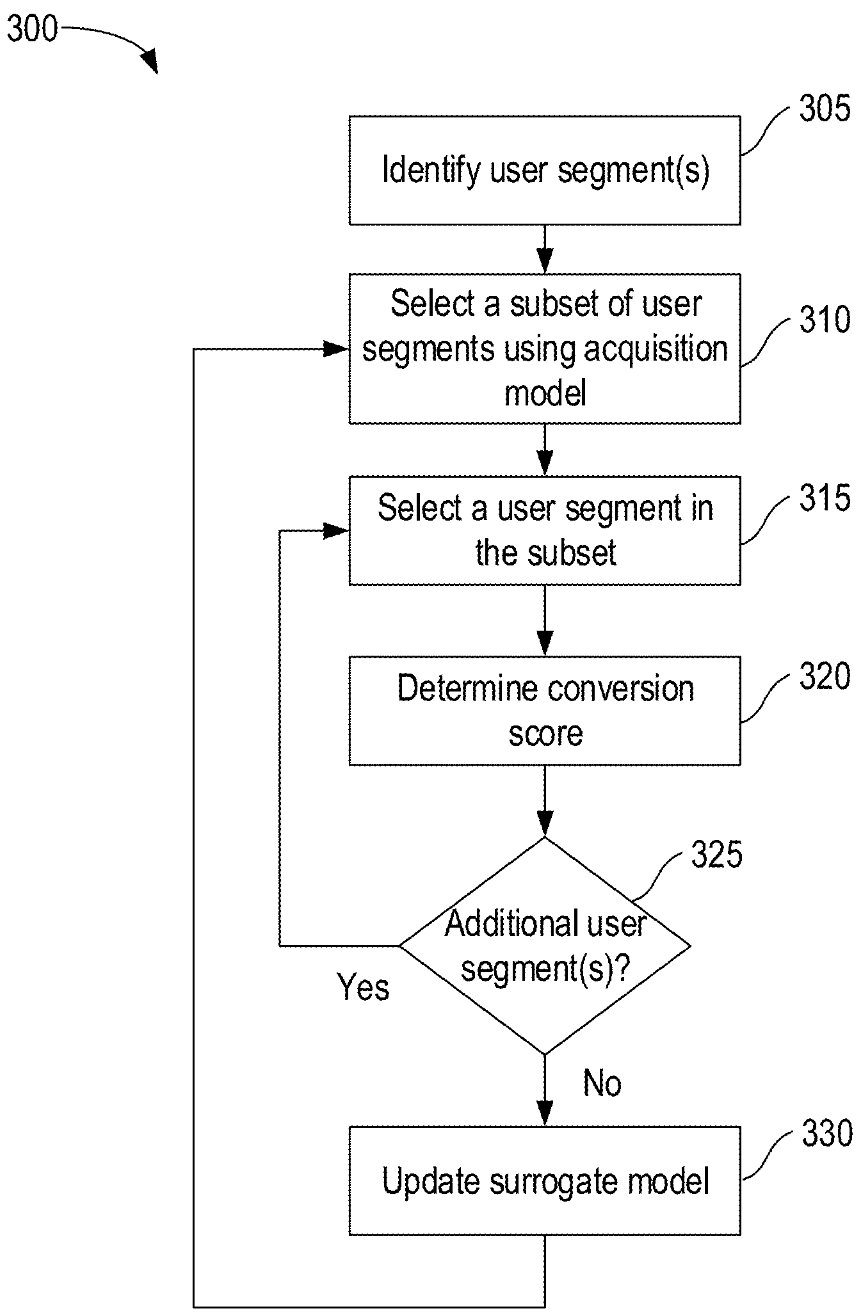
FIG. 3 is a flow diagram depicting an example method of using and refining machine learning models to generate resource allocations.

Example Method for Use and Training of Machine Learning Models to Allocate Resources FIG. 3 is a flow diagram depicting an example method 300 of using and refining machine learning models to generate resource allocations. In some embodiments, the method 300 is performed by an allocation system, such as the allocation system 120 of FIG. 1.

The method 300 begins at block 305, where the allocation system identifies the set of user segments. In some embodiments, as discussed above, the allocation system can identify the set of user segments based on a set of user features, where each user segment in the set corresponds to a particular set of values for each of the user features. For example, a user segment may correspond to males aged 35-44 who do not share a bed with any partners, living in suburban locales in the northeast. In embodiments, there may be any number of user segments, depending on the number of user features (and the number of categories or potential values for each feature).

As discussed above, in some embodiments, the features and segments can more broadly include other elements, such as the particular method of delivering the content, the specific piece of content being delivered, and the like.

At block 310, the allocation system selects a subset of user segments, from the overall set, using a surrogate model and/or an acquisition model. For example, as discussed above, the allocation system may use the surrogate model to generate a predicted conversion score, a variance of the predicted conversion score, or both. The acquisition model may then be used to select a subset of the user segments (e.g., using an exploration-exploitation approach). In some embodiments, if the surrogate model is not available (e.g., during initialization of the system, such as during the first round), the allocation system can select the subset of user segments randomly or semi-randomly. For example, as discussed above, the allocation system may randomly select user segments while ensuring that each value of each feature is reflected at least once in the subset. That is, the allocation system can ensure that, for each possible feature value, at least one segment in the selected subset has that value. In some embodiments, rather than a random process, the allocation system may select the initial user segments based on domain knowledge (e.g., using information from subject matter experts), as discussed above. One example of selecting the subset of segments is described in more detail below with reference to FIG. 4.

At block 315, the allocation system can select a user segment from the selected subset. In embodiments, this selection can be performed using any suitable criteria, as the allocation system will iterate through all of the selected user segments during the method 300. Although the illustrated example depicts a sequential process of selecting user segments for conceptual clarity, in some embodiments, some or all of the user segments may be processed partially or entirely in parallel.

At block 320, the allocation system determines a conversion score for the selected segment. In some embodiments, as discussed above, determining the conversion score includes allocating one or more resources to the selected segment, and performing one or more experiments to quantify or identify the benefits, improvements, or other output that results from the allocation. For example, in a targeted content or diagnostics deployment, the allocation system may use allocated resources to target one or more media or creative elements to the segment, in an effort to identify and diagnose users with particular disorders (e.g., OSA). In one such embodiment, the conversion score may correspond to data such as the total number of diagnoses that are made in the segment (using the targeted content), the resource cost-per-diagnosis, and the like. One example of using experimentation to determine the conversion score for the segment is discussed in more detail below, with reference to FIG. 5.

In some embodiments, as discussed above, determining the conversion score involves performing one or more simulations to synthesize the conversion score (e.g., to approximate what the conversion score would be, if an experiment were actually performed).

At block 325, the allocation system determines whether one or more user segments in the selected subset have not been evaluated. If so, the method 300 returns to block 315. If all of the segments in the selected subset have been evaluated to determine a corresponding conversion score for each, the method 300 continues to block 330.

At block 330, the allocation system updates the surrogate model based on the determined conversion scores. In an embodiment, this may include training a model from scratch, or refining the existing surrogate model to align with the newly-determined data points (e.g., the conversion scores). As discussed above, the surrogate model can generally learn to predict conversion scores for all of the user segments, even if only a subset of the segments have actually been evaluated. One example of updating the surrogate model is discussed in more detail below with reference to FIG. 6.

Once the surrogate model has been updated based on the new conversion scores, the method 300 returns to block 310 to select a new subset of user segments using the updated surrogate model. In this way, the allocation system can continue to dynamically select segments and allocate resources accordingly, using models that are refined continuously or periodically based on real-world data. This can significantly improve the functioning of the allocation system, as well as improving the efficiency of resource usage. Further, depending on the particular resource(s) being allocated and the problem being solved, the techniques described herein can have a variety of far-reaching impacts, including increased and improved diagnostics (e.g., identifying and diagnosing more people more accurately).

Example Method for Using Machine Learning to Allocate Resources

Figure 4:
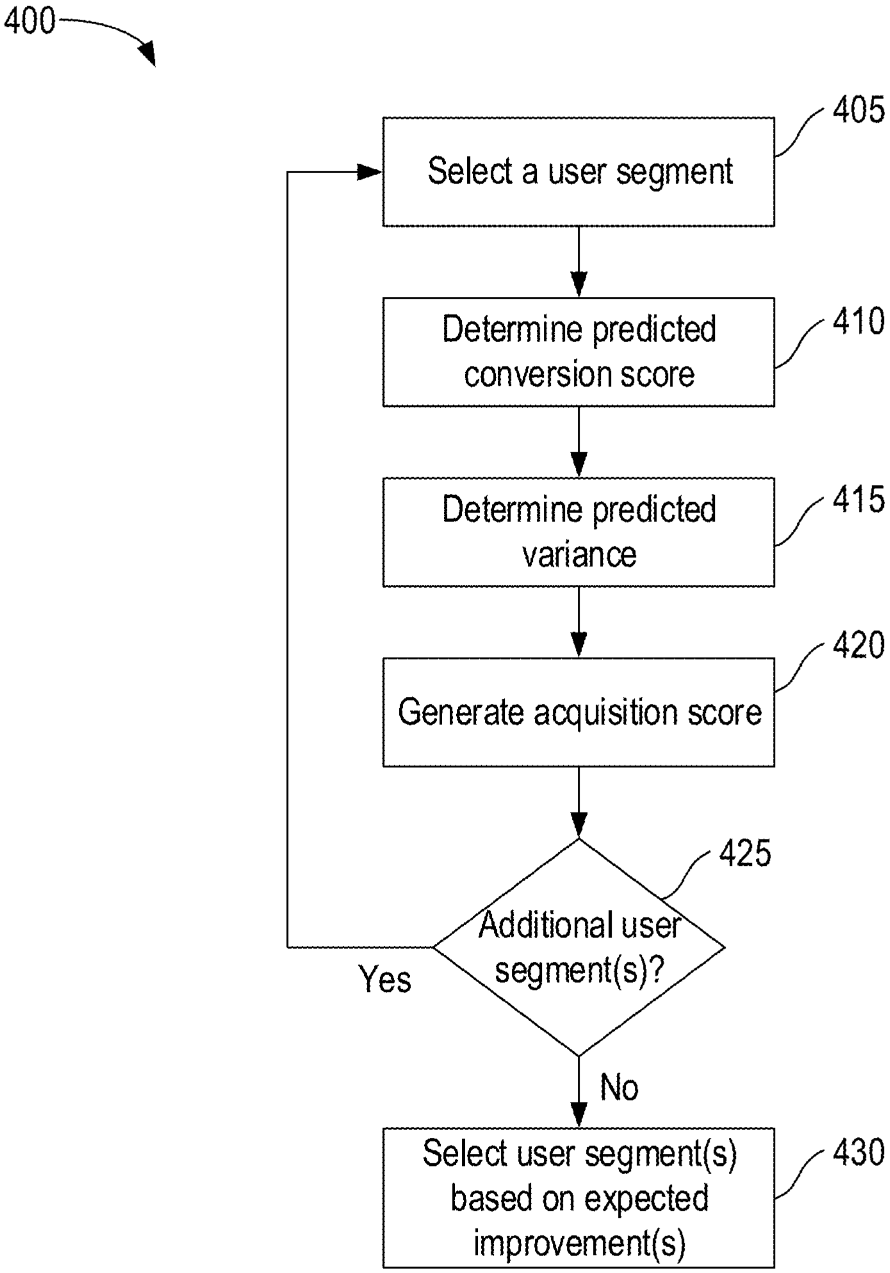
FIG. 4 is a flow diagram depicting an example method of using machine learning to generate resource allocations.

FIG. 4 is a flow diagram depicting an example method 400 of using machine learning to generate resource allocations. In some embodiments, the method 400 is performed by an allocation system, such as the allocation system 120 of FIG. 1. In one embodiment, the method 400 provides additional detail for block 310 of FIG. 3, where the allocation system selects the subset of segments to be tested.

At block 405, the allocation system selects a user segment, from the overall set of user segments. That is, the allocation system selects one of the user segments from the set of all user segments (e.g., from the set of all possible combinations of features) for evaluation, in order to determine whether to include the selected segment in the subset of segments that will be allocated resources. In embodiments, any suitable technique can be used to select this segment for evaluation. In some embodiments, the allocation system can evaluate all of the possible segments (e.g., using the surrogate model). In other embodiments, the allocation system may use one or more techniques (such as greedy heuristics) to selectively select and evaluate the segments. Although the illustrated example depicts a sequential selection and evaluation of each segment, in some aspects, the allocation system can evaluate some or all of the user segments entirely or partially in parallel.

At block 410, the allocation system determines a predicted conversion score for the selected user segment using the surrogate model. In one embodiment, to determine the predicted score, the allocation system may use the relevant feature values for the user segment as the input to the model, where the generated inference corresponds to a predicted conversion score for the segment. In some embodiments, as discussed above, the allocation system uses a linear regression model for the surrogate model. In some embodiments, the surrogate model is a random forest. In one such embodiment, the allocation system determines the predicted conversion score output by each regression tree in the forest, and aggregates these scores (e.g., by determining the mean of them) to generate the predicted conversion score for the user segment.

At block 415, the allocation system can optionally determine a variance of the predicted conversion score for the user segment. For example, if the surrogate model is a random forest, the allocation system can determine the variance (e.g., the standard deviation) of the outputs from each tree in the forest. In one embodiment, if the surrogate mode is a linear regression model, the allocation system may be unable to determine a variance of the score, as the model may not output or involve such variance. In at least one embodiment, in addition to or instead of determining the variance, the allocation system may determine other aspects of the score, such as a confidence indicated by the surrogate model.

At block 420, the allocation system generates an acquisition score for the user segment using an acquisition model. For example, as discussed above, the allocation system may use an exploration-exploitation function that generates an overall aggregate prediction for the user segment that is based on the predicted conversion score and the determined variance. By modifying the parameters of the acquisition model, the allocation system (or a user) may be able to balance the acquisition model to score segments based on the predicted conversion score (e.g., where the predicted conversion score is positively correlated with the expected improvement) as well as the variance of the prediction (e.g., where higher variance may also be positively correlated with the expected improvement). Balancing these factors can enable the allocation system to take advantage of high conversion scores (e.g., the "exploit" portion of the technique) while probing new segments that may be highly valuable, as indicated by large variances (e.g., the "explore" portion).

At block 425, the allocation system determines whether there is at least one additional user segment, in the total set of segments, which has not yet been evaluated. If so, the method 400 returns to block 405. Alternatively, in some aspects where one or more heuristics are applied (rather than evaluating all possible segments), the allocation system can determine whether a defined number of user segments have already been evaluated and/or selected to receive resources. If not, the method 400 can return to block 405.

If no additional segments remain to be evaluated (or need to be evaluated), the method 400 continues to block 430, where the allocation system selects a subset of the user segments based on the generated acquisition scores. For example, the allocation system may select the N segments having the highest acquisition scores, where N may be a user-defined hyperparameter (or may be determined based on the quantity of resources available). This selected subset can then be allocated resources, as discussed above.

In some embodiments, to select the subset of segments, the allocation system can use a sequential acquisition process. In one such embodiment, the allocation system can select a first acquisition point (e.g., a first segment) having the highest acquisition score. The allocation system may then use the predicted conversion data for the selected segment as a fake "ground truth" to refine the surrogate model. That is, the allocation system can append this segment and predicted conversion score as another training exemplar, and use it to refine the model.

To continue the sequential acquisition process, the allocation system may then use the refined surrogate model to generate new conversion data for each segment, and select the second segment for the allocation (e.g., the segment having the highest score, or the highest-scored segment that has not already been selected). This process can then be repeated until the desired number of segments have been selected.

Example Method for Allocating and Monitoring Resources Using Machine Learning

Figure 5:
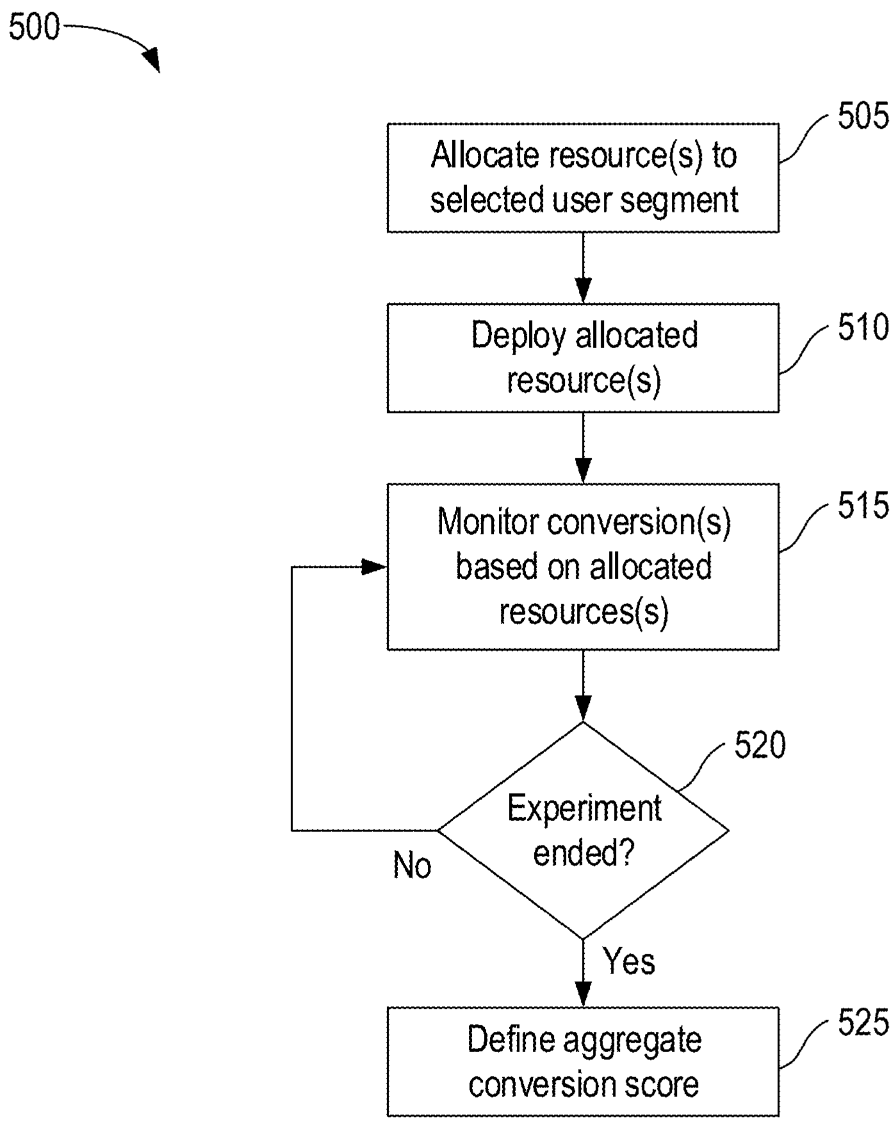
FIG. 5 is a flow diagram depicting an example method of allocating resources and monitoring the allocations to refine machine learning models.

FIG. 5 is a flow diagram depicting an example method 500 of allocating resources and monitoring the allocations to refine machine learning models. In some embodiments, the method 500 is performed by an allocation system, such as the allocation system 120 of FIG. 1. In one embodiment, the method 500 provides additional detail for block 320 of FIG. 3, where the allocation system determines the conversion score for a selected user segment.

At block 505, the allocation system allocates one or more resources to each selected user segment in the selected subset of user segments. That is, for each segment in the subset of segments (from the set of all existing segments) that were selected for further evaluation (e.g., using the method 400 of FIG. 4), the allocation system can allocate one or more resources in order to evaluate the benefits or improvements that accrue form the allocation. For example, in a targeted testing or diagnostics deployment, the allocation system may allocate advertising budget, creative budget, computational resources, and the like to attempt to identify and diagnose users in the segment.

At block 510, the allocation system (or another system) deploys the resources. As above, the particular techniques used to deploy the resources may depend at least in part on what the underlying resources are, and what the target solution is. In a targeted diagnostics deployment, deploying the resources may involve engaging with one or more third parties (e.g., social medial platforms) to distribute the targeted content, and the like.

At block 515, the allocation system then monitors the segments, such as by identifying or quantifying conversions achieved based on the allocated resources. For example, in the case of targeted diagnostics, the allocation system can determine the number of users (in each selected segment) who saw the content (also referred to as a number of impressions), the number of users who clicked or followed the content (also referred to as a number of clicks), the number of users who followed through with the subsequent content, such as by finishing a test or survey associated with the content (also referred to as the number of completions), the number of users who were subsequently diagnosed based on the test or survey (also referred to as the number of diagnoses), and the like.

In some embodiments, the allocation system can additionally or alternatively use a conversion rate or percentage, in order to normalize for the size(s) of each segment and thereby maximize efficiency of the resource allocation. For example, the allocation system may determine various metrics such as the cost-per-click, the cost-per-diagnosis, and the like. That is, rather than identifying solely the number of diagnoses, the allocation system can determine how many resources were required to obtain each diagnosis, on average. This can allow the allocation system to learn to generate improved resource allocations that target increased diagnoses using fewer resources.

At block 520, the allocation system determines whether the experiment has ended. For example, the experiment may be performed over a defined window of time, such as one week or one month, or may use a variable length (such as until a fixed number of clicks or diagnoses are obtained). If the experiment has not concluded, the method 500 returns to block 515 to continue monitoring the conversions in the subset of segments. If the experiment has concluded, the method 500 continues to block 525.

At block 525, the allocation system defines one or more aggregate conversion score(s) for the user segment(s). This aggregate score generally reflects the benefits or improvements that were realized by using the allocated resources for the segment. In some embodiments, the aggregate conversion score is a single value, which may be generated based on a weighted or unweighted combination of individual elements (e.g., to include not only the cost-per-diagnosis, but also the number of diagnoses, the number of test completions, and the like). In at least one embodiment, the aggregate conversion score may be a composite score having multiple discrete values (e.g., specifying the cost-per-diagnosis, as well as the total number of diagnoses, separately).

In one such embodiment, the surrogate model may be trained to generate multiple predictions, rather than a single conversion score. Continuing the above example, the surrogate model may predict not only the cost-per-diagnosis for each segment, but also the total number of diagnoses. In some embodiments, the allocation system can use a separate surrogate model for each such output (e.g., a first surrogate model may be trained to predict the cost-per-diagnosis, and a second surrogate model may be trained to predict the total number of diagnoses). In one embodiment, if multiple surrogate models are used (or if a single model outputs multiple predicted values for each segment), the allocation system may similarly use an acquisition model that balances or weights each independent prediction to enable improved segment selection.

Figure 6:
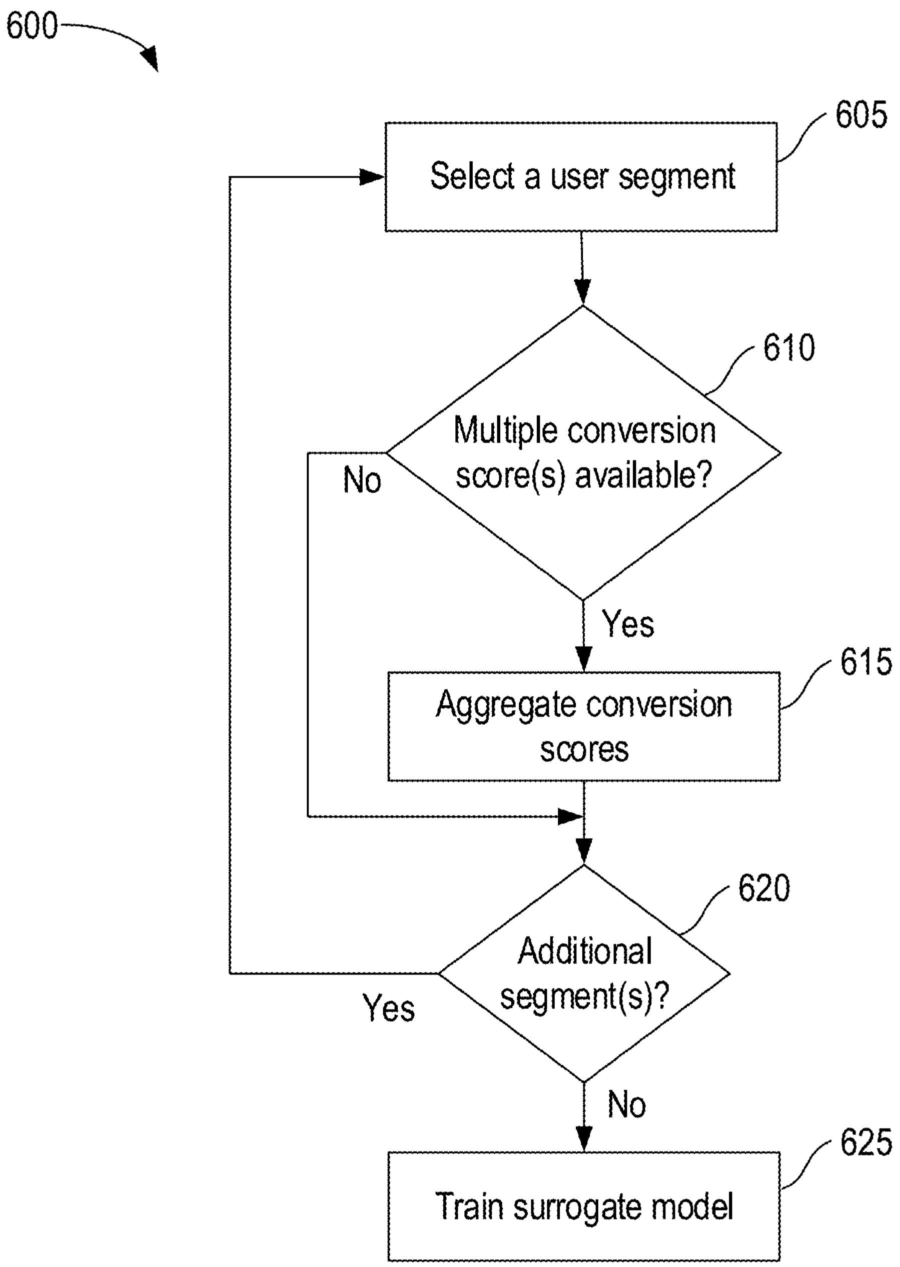
FIG. 6 is a flow diagram depicting an example method of training machine learning models to drive resource allocations.

Example Method for Training Machine Learning Models to Drive Resource Allocations FIG. 6 is a flow diagram depicting an example method 600 of training machine learning models to drive resource allocations. In some embodiments, the method 600 is performed by an allocation system, such as the allocation system 120 of FIG. 1. In one embodiment, the method 600 provides additional detail for block 330 of FIG. 3, where the allocation system updates or trains the surrogate model.

At block 605, the allocation system selects a user segment for processing. In some embodiments, the allocation system selects the user segment from a subset of user segments that have been tested or evaluated at least once. That is, the allocation system may select a user segment that has had resources allocated at least once for experimentation (or that has had a simulation executed at least once). As untested segments do not have any real-world or synthesized conversion data available, they generally cannot be used to train or refine the surrogate model. However, any segments that have been tested at least once (and therefore have at least some real-world data and/or synthesized data) can be used to refine the model.

The particular technique used to select a segment from this set may vary depending on the particular implementation, as the allocation system will iterate through each to use all relevant data points. Although the illustrated example depicts a sequential iteration (processing each such segment in turn) for conceptual clarity, in some embodiments, the allocation system may process some or all of the segments partially or entirely in parallel.

At block 610, the allocation system determines whether the selected segment has multiple conversion score(s). That is, the allocation system can determine whether the selected segment has been tested multiple times, resulting in multiple scores generated during the multiple experiments or simulations. If not, the method 600 continues to block 620. If the selected segment has multiple scores, the method 600 continues to block 615, where the allocation system aggregates the available conversion scores for the segment. For example, the allocation system may determine the average of the multiple scores, in order to identify an overall or aggregate conversion score for the segment. This aggregate score can then be used as the representative label for the segment when training the surrogate model(s). The method 600 then continues to block 620.

Though the illustrated example depicts aggregating the conversion scores for training purposes, in some aspects, the allocation system can use each conversion score as a separate data point in refining the model.

At block 620, the allocation system determines whether there are any additional segment(s) that have not been evaluated using the method 600. If so, the method 600 returns to block 605. If not, the method 600 continues to block 625, where the allocation system trains the surrogate model(s) based on the conversion scores.

In an embodiment, to train the surrogate model, the allocation system can use the features that define a given user segment as input to the model, and use the corresponding conversion score (or aggregate conversion score, as applicable) as target output to the model. For example, the allocation system may use the model to generate an output using the input features, and compare this output to the actual conversion score(s) for the segment to generate a loss, which may then be used to refine the model(s).

For example, in the case of linear regression, the allocation system may use ordinary least squares or gradient descent to iteratively refine the weights assigned, by the model, to each feature. This allows the surrogate model to iteratively learn to generate more accurate predictions for the input features. In the case of a random forest model, the allocation system may use losses such as mean squared error, least absolute deviance, and the like, in order to iteratively modify and refine the decision boundaries used at each step of each tree, thereby improving the overall predictions.

In embodiments, the allocation system may train the surrogate model using individual data points (e.g., independently refining the model for each user segment), or may do so in batches (e.g., by aggregating the loss across multiple segments before refining the weights of the model). Once the surrogate model is trained or refined, it can be used to select the next subset of segments for the subsequent round of resource allocation.

Example Method for Generating Resource Allocations Using Machine Learning

Figure 7:
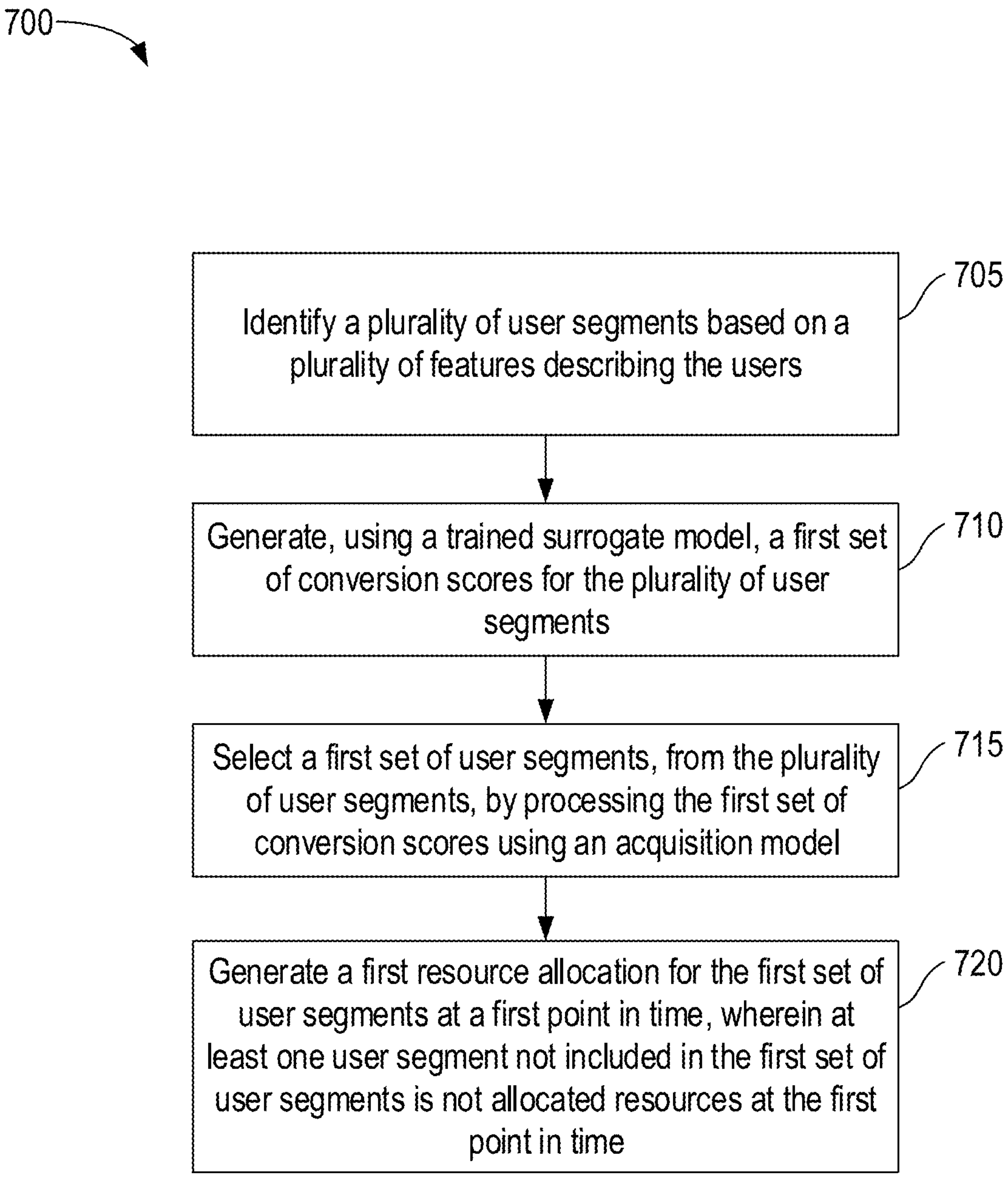
FIG. 7 is a flow diagram depicting an example method of generating resource allocation using machine learning.

FIG. 7 is a flow diagram depicting an example method of generating resource allocation using machine learning. In some embodiments, the method 700 is performed by an allocation system, such as the allocation system 120 of FIG. 1.

At block 705, a plurality of user segments is identified based on a plurality of features describing the users.

At block 710, a first set of predicted conversion scores is generated, using a trained surrogate model, for the plurality of user segments.

At block 715, selecting a first set of user segments, from the plurality of user segments, by processing the first set of predicted conversion scores using an acquisition model.

At block 720, a first resource allocation is generated for the first set of user segments at a first point in time, wherein at least one user segment not included in the first set of user segments is not allocated resources at the first point in time.

In some embodiments, the method 700 further includes determining a first set of predicted conversion scores for the first set of user segments based on the first resource allocation, and refining the trained surrogate model based on the first set of conversion scores.

In some embodiments, the method 700 further includes generating, using the trained surrogate model, a second set of conversion scores for the plurality of user segments, selecting a second set of user segments, from the plurality of user segments, by processing the second set of conversion scores using the acquisition model, and generating a second resource allocation for the second set of user segments at a second point in time.

In some embodiments, the method 700 further includes determining a second set of conversion scores for the second set of user segments based on the second resource allocation, and refining the trained surrogate model based on the first set of conversion scores and the second set of conversion scores.

In some embodiments, the first set of predicted conversion scores indicate predicted conversions when allocating resources to each of the plurality of user segments.

In some embodiments, the method 700 further includes, prior to selecting the first set of user segments: selecting an initialization set of user segments, from the plurality of user segments, determining an initialization set of conversion scores for the initialization set of user segments, and initializing the trained surrogate model by training the trained surrogate model based on the initialization set of conversion scores.

In some embodiments, the trained surrogate model comprises a random forest model.

In some embodiments, selecting the first set of user segments comprises, for each respective user segment of the plurality of user segments: determining a respective predicted conversion score using the trained surrogate model, and determining a respective variance of the respective predicted conversion score using the trained surrogate model, and the method 700 further includes selecting the first set of user segments, using the acquisition model, based on the predicted conversion scores and the variances.

In some embodiments, the plurality of user segments are orthogonal.

In some embodiments, the plurality of features comprise at least one of: user age, user gender, user bed-sharing status, user location type, user region, user education level, or user device type.

In some embodiments, the first resource allocation for the first set of user segments at the first point in time comprises providing targeted content to the first set of user segments during a window of time, and the at least one user segment not included in the first set of user segments does not receive targeted content during the window of time.

Example Processing System for Machine Learning to Allocate Resources

Figure 8:
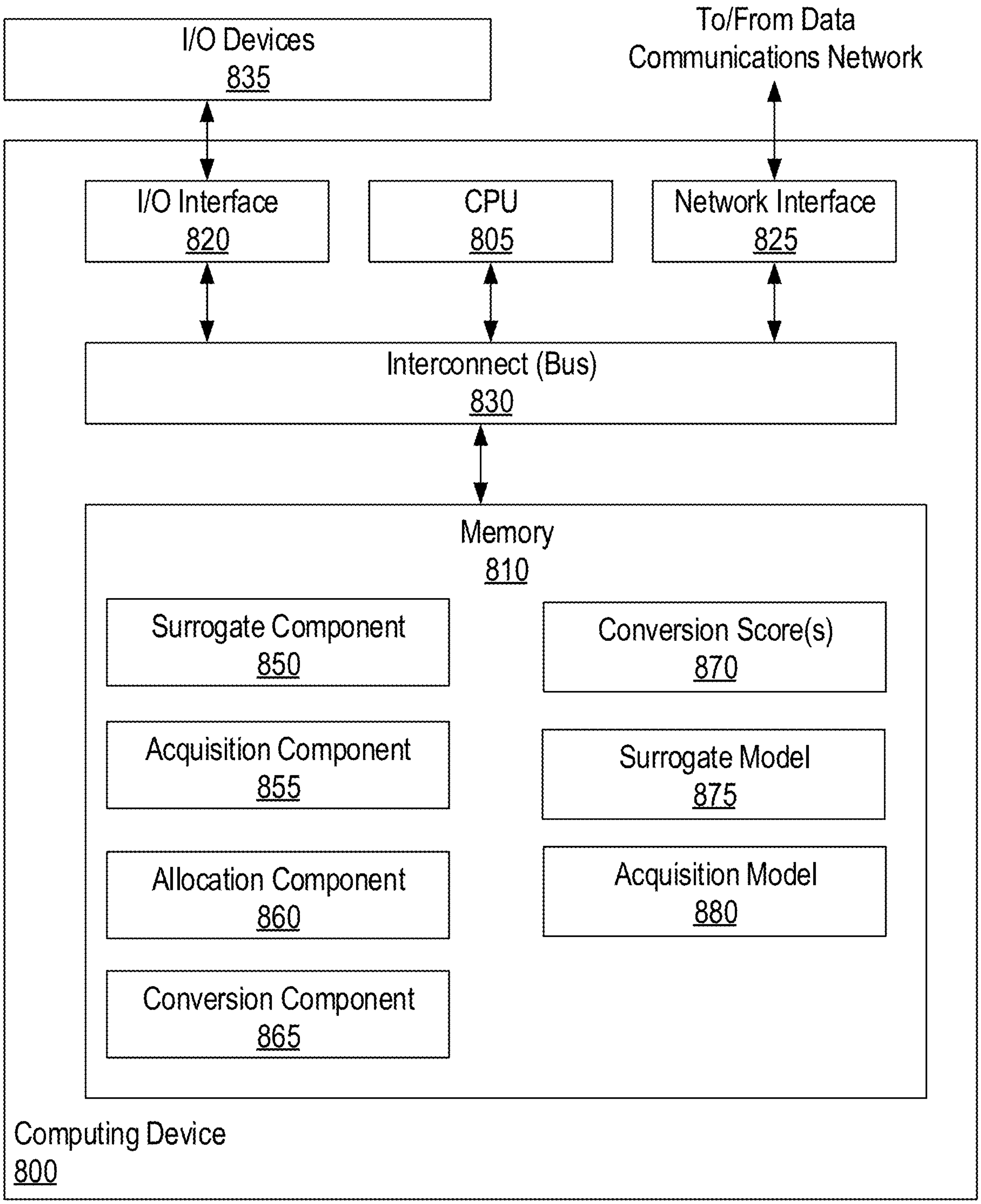
FIG. 8 depicts an example computing device configured to perform various aspects of the present disclosure.

FIG. 8 depicts an example computing device 800 configured to perform various aspects of the present disclosure. Although depicted as a physical device, in embodiments, the computing device 800 may be implemented using virtual device(s), and/or across a number of devices (e.g., in a cloud environment). In one embodiment, the computing device 800 corresponds to the allocation system 120 of FIG. 1.

As illustrated, the computing device 800 includes a CPU 805, memory 810, a network interface 825, and one or more I/O interfaces 820. In the illustrated embodiment, the CPU 805 retrieves and executes programming instructions stored in memory 810, as well as stores and retrieves application data residing in memory 810. The CPU 805 is generally representative of a single CPU and/or GPU, multiple CPUs and/or GPUs, a single CPU and/or GPU having multiple processing cores, and the like. The memory 810 is generally included to be representative of a random access memory. In some embodiments, memory 810 may also or alternatively correspond to storage, such as using any combination of disk drives, flash-based storage devices, and the like, and may include fixed and/or removable storage devices, such as fixed disk drives, removable memory cards, caches, optical storage, network attached storage (NAS), or storage area networks (SAN).

In some embodiments, I/O devices 835 (such as keyboards, monitors, etc.) are connected via the I/O interface(s) 820. Further, via the network interface 825, the computing device 800 can be communicatively coupled with one or more other devices and components (e.g., via a network, which may include the Internet, local network(s), and the like). As illustrated, the CPU 805, memory 810, network interface(s) 825, and I/O interface(s) 820 are communicatively coupled by one or more buses 830.

In the illustrated embodiment, the memory 810 includes a surrogate component 850, an acquisition component 855, an allocation component 860, and a conversion component 865, which may perform one or more embodiments discussed above. Although depicted as discrete components for conceptual clarity, in embodiments, the operations of the depicted components (and others not illustrated) may be combined or distributed across any number of components. Further, although depicted as software residing in memory 810, in embodiments, the operations of the depicted components (and others not illustrated) may be implemented using hardware, software, or a combination of hardware and software.

In some embodiments, the surrogate component 850 may generally be used to train and/or use the surrogate model(s) discussed above. For example, the surrogate component 850 may use real-world or simulated conversion data to train and/or refine one or more surrogate models to predict future conversion scores. Once trained, the surrogate component 850 can use the model(s) to predict conversion data (e.g., cost-per-diagnosis) for each user segment, as discussed above.

The acquisition component 855 is generally configured to select subsets of user segments based on an acquisition model or function, as discussed above. For example, the acquisition component 855 may evaluate the output of the surrogate component 850 (e.g., the predicted conversion score(s), the variance(s) of these scores, and the like) to generate an overall acquisition score for each user segment. Using these scores, the acquisition component 855 can select a subset of segments (e.g., the N segments with the highest scores) to be allocated resources during a future window of time.

The allocation component 860 may be configured to allocate resources to the subset of user segments that is selected by the acquisition component 855. For example, the allocation component 860 may assign and/or deploy resources such as computational resources (e.g., computing time, memory space, storage space, and the like), monetary resources (e.g., for targeted content), and the like. In some embodiments, the allocation component 860 can itself allocate and deploy the resources (e.g., by engaging with one or more social media platforms to distribute targeted content). In other embodiments, the allocation component 860 may facilitate or initiate the deployment (e.g., by indicating the resource(s) to be allocated, and allowing a user or other component to actually deploy them).

The conversion component 865 may generally be used to evaluate allocated resources in order to determine conversion data for the segments to which resources were allocated. For example, in some embodiments, the conversion component 865 can use one or more models to simulate or synthesize conversion data for the segment(s), as discussed above. In some embodiments, the conversion component 865 can monitor real-world conversions (e.g., as targeted content is distributed during an experimentation phase) to determine the conversion data. As discussed above, this conversion data is generally used to refine the surrogate model to improve future allocations.

In the illustrated example, the memory 810 also includes conversion score(s) 870 (which may include real data and/or synthesized data) for each user segment that has been tested, one or more surrogate models 875 (which may correspond to the surrogate model 125 of FIG. 1), and one or more acquisition models 880 (which may correspond to the acquisition model 130 of FIG. 1). Although depicted as residing in memory 810, the conversion scores 870, surrogate model 875, and acquisition model 880 may be stored in any suitable location, including remote storage. Generally, the conversion scores 870 includes the previously-determined conversion data for each user segment that has been tested. These conversion scores 870 can be used to train or refine the surrogate model 875, as discussed above. The surrogate model 875 can generally be used (e.g., by the surrogate component 850) to predict conversion data for the user segments, and the acquisition model 880 may be used to select a subset of segments (based on the predicted conversion data) for resource allocation.

Example Clauses

Implementation examples are described in the following numbered clauses:

Clause 1: A method, comprising: identifying a plurality of user segments based on a plurality of features describing the users; generating, using a trained surrogate model, a first set of predicted conversion scores for the plurality of user segments; selecting a first set of user segments, from the plurality of user segments, by processing the first set of predicted conversion scores using an acquisition model; and generating a first resource allocation for the first set of user segments at a first point in time, wherein at least one user segment not included in the first set of user segments is not allocated resources at the first point in time.

Clause 2: The method of Clause 1, further comprising: determining a first set of conversion scores for the first set of user segments based on the first resource allocation; and refining the trained surrogate model based on the first set of conversion scores.

Clause 3: The method of any one of Clauses 1-2, further comprising: generating, using the trained surrogate model, a second set of conversion scores for the plurality of user segments; selecting a second set of user segments, from the plurality of user segments, by processing the second set of conversion scores using the acquisition model; and generating a second resource allocation for the second set of user segments at a second point in time.

Clause 4: The method of any one of Clauses 1-3, further comprising: determining a second set of conversion scores for the second set of user segments based on the second resource allocation; and refining the trained surrogate model based on the first set of conversion scores and the second set of conversion scores.

Clause 5: The method of any one of Clauses 1-4, wherein the first set of predicted conversion scores indicate predicted conversions when allocating resources to each of the plurality of user segments.

Clause 6: The method of any one of Clauses 1-5, further comprising: prior to selecting the first set of user segments: selecting an initialization set of user segments, from the plurality of user segments; determining an initialization set of conversion scores for the initialization set of user segments; and initializing the trained surrogate model by training the trained surrogate model based on the initialization set of conversion scores.

Clause 7: The method of any one of Clauses 1-6, wherein the trained surrogate model comprises a random forest model.

Clause 8: The method of any one of Clauses 1-7, wherein selecting the first set of user segments comprises: for each respective user segment of the plurality of user segments: determining a respective predicted conversion score using the trained surrogate model; and determining a respective variance of the respective predicted conversion score using the trained surrogate model; and selecting the first set of user segments, using the acquisition model, based on the predicted conversion scores and the variances.

Clause 9: The method of any one of Clauses 1-8, wherein the plurality of user segments are orthogonal.

Clause 10: The method of any one of Clauses 1-9, wherein the plurality of features comprise at least one of: user age, user gender, user bed-sharing status, user location type, user region, user education level, or user device type.

Clause 11: The method of any one of Clauses 1-10, wherein: the first resource allocation for the first set of user segments at the first point in time comprises providing targeted content to the first set of user segments during a window of time, and the at least one user segment not included in the first set of user segments does not receive targeted content during the window of time.

Clause 12: A system, comprising: a memory comprising computer-executable instructions; and one or more processors configured to execute the computer-executable instructions and cause the processing system to perform a method in accordance with any one of Clauses 1-11.

Clause 13: A system, comprising means for performing a method in accordance with any one of Clauses 1-11.

Clause 14: A non-transitory computer-readable medium comprising computer-executable instructions that, when executed by one or more processors of a processing system, cause the processing system to perform a method in accordance with any one of Clauses 1-11.

Clause 15: A computer program product embodied on a computer-readable storage medium comprising code for performing a method in accordance with any one of Clauses 1-11.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or systems (e.g., allocation system 120) or related data available in the cloud. For example, the allocation system 120 could execute on a computing system in the cloud and generate resource allocations. In such a case, the allocation system 120 could train surrogate models, use them to predict conversion data, and allocate resources, as well as store these models and data at a storage location in the cloud. Doing so allows a user to access this information from any computing system attached to a network connected to the cloud (e.g., the Internet).

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:

identifying a plurality of user segments based on a plurality of features describing users;

initializing training of a surrogate model using a warm start operation, comprising:

selecting a set of initialization segments based on historical conversion information, wherein each respective initialization segment comprises a respective group of user segments, from the plurality of user segments, determining, for the set of initialization segments, an initialization set of conversion scores using a simulation model, wherein the initialization set of conversion scores represent estimated outcomes associated with resource allocations, and initializing the surrogate model by training the surrogate model using the initialization set of conversion scores;

generating, using the trained surrogate model, a first set of predicted conversion scores for the plurality of user segments;

selecting a first set of user segments, from the plurality of user segments, by processing the first set of predicted conversion scores using an acquisition model; and generating a first resource allocation for the first set of user segments at a first point in time, wherein at least one user segment not included in the first set of user segments is not allocated resources at the first point in time.

2. The method of claim 1, further comprising:

determining a first set of conversion scores for the first set of user segments based on the first resource allocation; and refining the trained surrogate model based on the first set of conversion scores.

3. The method of claim 2, further comprising:

generating, using the trained surrogate model, a second set of predicted conversion scores for the plurality of user segments;

selecting a second set of user segments, from the plurality of user segments, by processing the second set of predicted conversion scores using the acquisition model; and generating a second resource allocation for the second set of user segments at a second point in time.

4. The method of claim 3, further comprising:

determining a second set of conversion scores for the second set of user segments based on the second resource allocation; and refining the trained surrogate model based on the first set of conversion scores and the second set of conversion scores.

5. The method of claim 1, wherein the first set of predicted conversion scores indicate predicted conversions when allocating resources to each of the plurality of user segments.

6. The method of claim 1, wherein the trained surrogate model comprises a random forest model.

7. The method of claim 1, wherein selecting the first set of user segments comprises:

for each respective user segment of the plurality of user segments:

determining a respective predicted conversion score using the trained surrogate model; and determining a respective variance of the respective predicted conversion score using the trained surrogate model; and selecting the first set of user segments, using the acquisition model, based on the predicted conversion scores and the variances.

8. The method of claim 1, wherein the plurality of user segments are orthogonal.

9. The method of claim 1, wherein the plurality of features comprise at least one of: user age, user gender, user bed-sharing status, user location type, user region, user education level, or user device type.

10. The method of claim 1, wherein:

the first resource allocation for the first set of user segments at the first point in time comprises providing targeted content to the first set of user segments during a window of time, and the at least one user segment not included in the first set of user segments does not receive targeted content during the window of time.

11. A system, comprising:

a memory comprising computer-executable instructions; and one or more processors configured to execute the computer-executable instructions and cause the system to perform an operation comprising:

identifying a plurality of user segments based on a plurality of features describing users;

initializing training of a surrogate model using a warm start operation, comprising:

selecting a set of initialization segments based on historical conversion information, wherein each respective initialization segment comprises a respective group of user segments, from the plurality of user segments, determining, for the set of initialization segments, an initialization set of conversion scores using a simulation model, wherein the initialization set of conversion scores represent estimated outcomes associated with resource allocations, and initializing the surrogate model by training the surrogate model using the initialization set of conversion scores;

generating, using the trained surrogate model, a first set of predicted conversion scores for the plurality of user segments;

selecting a first set of user segments, from the plurality of user segments, by processing the first set of predicted conversion scores using an acquisition model; and generating a first resource allocation for the first set of user segments at a first point in time, wherein at least one user segment not included in the first set of user segments is not allocated resources at the first point in time.

12. The system of claim 11, the operation further comprising:

determining a first set of conversion scores for the first set of user segments based on the first resource allocation; and refining the trained surrogate model based on the first set of conversion scores.

13. The system of claim 12, the operation further comprising:

generating, using the trained surrogate model, a second set of predicted conversion scores for the plurality of user segments;

selecting a second set of user segments, from the plurality of user segments, by processing the second set of predicted conversion scores using the acquisition model; and generating a second resource allocation for the second set of user segments at a second point in time.

14. The system of claim 13, the operation further comprising:

determining a second set of conversion scores for the second set of user segments based on the second resource allocation; and refining the trained surrogate model based on the first set of conversion scores and the second set of conversion scores.

15. The system of claim 11, wherein selecting the first set of user segments comprises:

for each respective user segment of the plurality of user segments:

determining a respective predicted conversion score using the trained surrogate model; and determining a respective variance of the respective predicted conversion score using the trained surrogate model; and selecting the first set of user segments, using the acquisition model, based on the predicted conversion scores and the variances.

16. A non-transitory computer-readable media comprising instructions that, when executed by one or more processors of a processing system, cause the processing system to perform an operation comprising:

identifying a plurality of user segments based on a plurality of features describing users;

initializing training of a surrogate model using a warm start operation, comprising:

selecting a set of initialization segments based on historical conversion information, wherein each respective initialization segment comprises a respective group of user segments, from the plurality of user segments, determining, for the set of initialization segments, an initialization set of conversion scores using a simulation model, wherein the initialization set of conversion scores represent estimated outcomes associated with resource allocations, and initializing the surrogate model by training the surrogate model using the initialization set of conversion scores;

generating, using the trained surrogate model, a first set of predicted conversion scores for the plurality of user segments;

selecting a first set of user segments, from the plurality of user segments, by processing the first set of predicted conversion scores using an acquisition model; and generating a first resource allocation for the first set of user segments at a first point in time, wherein at least one user segment not included in the first set of user segments is not allocated resources at the first point in time.

17. The non-transitory computer-readable media of claim 16, the operation further comprising:

determining a first set of conversion scores for the first set of user segments based on the first resource allocation; and refining the trained surrogate model based on the first set of conversion scores.

18. The non-transitory computer-readable media of claim 17, the operation further comprising:

generating, using the trained surrogate model, a second set of predicted conversion scores for the plurality of user segments;

selecting a second set of user segments, from the plurality of user segments, by processing the second set of predicted conversion scores using the acquisition model; and generating a second resource allocation for the second set of user segments at a second point in time.

19. The non-transitory computer-readable media of claim 18, the operation further comprising:

determining a second set of conversion scores for the second set of user segments based on the second resource allocation; and refining the trained surrogate model based on the first set of conversion scores and the second set of conversion scores.

* * * * *